United States Patent

Kanenari

(10) Patent No.: US 11,663,855 B2
(45) Date of Patent: May 30, 2023

(54) EXPIRATION DATE NOTIFICATION DEVICE AND METHOD FOR PUNCTURE REPAIR LIQUID

(71) Applicant: The Yokohama Rubber Co., LTD., Tokyo (JP)

(72) Inventor: Daisuke Kanenari, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 924 days.

(21) Appl. No.: 16/493,749

(22) PCT Filed: Jan. 22, 2018

(86) PCT No.: PCT/JP2018/001825
§ 371 (c)(1),
(2) Date: Sep. 12, 2019

(87) PCT Pub. No.: WO2018/179719
PCT Pub. Date: Oct. 4, 2018

(65) Prior Publication Data
US 2020/0009810 A1 Jan. 9, 2020

(30) Foreign Application Priority Data
Mar. 27, 2017 (JP) .............................. JP2017-061770

(51) Int. Cl.
*G07C 3/06* (2006.01)
*B29C 73/24* (2006.01)
(Continued)

(52) U.S. Cl.
CPC ................ *G07C 3/06* (2013.01); *B29C 73/24* (2013.01); *G06Q 10/1091* (2013.01);
(Continued)

(58) Field of Classification Search
CPC ... B29C 73/166; B29C 73/24; B29L 2030/00; G06Q 10/1091; G07C 3/06; G07C 5/006;
(Continued)

(56) References Cited

U.S. PATENT DOCUMENTS 7,789,110 B2 * 9/2010 Marini .................. B29C 73/166
141/38
8,245,737 B2 * 8/2012 Stehle ..................... B60S 5/043
141/38
(Continued)

FOREIGN PATENT DOCUMENTS

JP 2003-040090 2/2003
JP 2006-021570 1/2006
(Continued)

OTHER PUBLICATIONS

International Search Report for International Application No. PCT/JP2018/001825 dated Mar. 20, 2018, 3 pages, Japan.

*Primary Examiner* — Tyler J Lee
(74) *Attorney, Agent, or Firm* — Thorpe North & Western

(57) ABSTRACT

An expiration date notification method includes activating an expiration date notification device for a puncture repair liquid installed in a vehicle that comprises a storage unit that stores an expiration date of a puncture repair liquid contained in a container, a notification condition setting unit that sets a notification period and a notification manner for notifying of a replacement period of the puncture repair liquid based on the expiration date stored in the storage unit, a notifying unit that notifies of the replacement period of the puncture repair liquid, and a control unit that controls the notifying unit based on settings of the notification condition setting unit; and notifying a user of the vehicle of the replacement period of the puncture repair liquid within a preset notification period including before and after the (Continued)

expiration date of the puncture repair liquid via a preset notification manner.

8 Claims, 4 Drawing Sheets

(51) Int. Cl.
    *G06Q 10/10*     (2023.01)
    *H04N 1/00*     (2006.01)
    *G07C 5/12*     (2006.01)
    *G07C 5/06*     (2006.01)
    *G07C 5/08*     (2006.01)
    *G06Q 10/1091*     (2023.01)
    *B29L 30/00*     (2006.01)
    *G07C 5/00*     (2006.01)

(52) U.S. Cl.
    CPC ...... *H04N 1/00236* (2013.01); *B29L 2030/00* (2013.01); *G07C 5/006* (2013.01); *G07C 5/008* (2013.01); *G07C 5/0825* (2013.01); *G07C 5/12* (2013.01)

(58) Field of Classification Search
    CPC ........ G07C 5/008; G07C 5/0825; G07C 5/12; H04N 1/00236
    See application file for complete search history.

(56) References Cited

U.S. PATENT DOCUMENTS

| | | | | |
|---|---|---|---|---|
| 8,297,321 | B2 * | 10/2012 | Chou | B29C 73/166 141/38 |
| 8,459,150 | B2 * | 6/2013 | Yoshida | B29C 73/166 81/15.3 |
| 8,627,857 | B2 * | 1/2014 | Chou | B29C 73/166 141/382 |
| 8,640,744 | B2 * | 2/2014 | Dowel | B29C 73/166 141/330 |
| 9,302,654 | B2 * | 4/2016 | Spindler | B60S 5/04 |
| 9,914,271 | B2 * | 3/2018 | Spindler | B60S 5/04 |
| 2008/0098855 | A1 * | 5/2008 | Cegelski | B29C 73/166 222/82 |
| 2014/0209207 | A1 | 7/2014 | Spindler et al. | |
| 2016/0176129 | A1 | 6/2016 | Spindler et al. | |

FOREIGN PATENT DOCUMENTS

| | | |
|---|---|---|
| JP | 2010-120250 | 6/2010 |
| JP | 2013-082137 | 5/2013 |
| JP | 2013-136176 | 7/2013 |
| JP | 2016-002929 | 1/2016 |
| JP | 2016-510269 | 4/2016 |
| WO | WO 2014/117098 | 7/2014 |
| WO | WO 2015/112267 | 7/2015 |

* cited by examiner

EXPIRATION DATE NOTIFICATION DEVICE AND METHOD FOR PUNCTURE REPAIR LIQUID

TECHNICAL FIELD

The present technology relates to a device and method of notifying of an expiration date of a puncture repair liquid installed in a vehicle and particularly relates to an expiration date notification device and method for a puncture repair liquid for reliably notifying users of an expiration date of a puncture repair liquid that also enable repair work of a punctured tire to be performed smoothly.

BACKGROUND ART

In recent years, when a tire mounted on a vehicle has punctured, a puncture repair fluid is injected into the tire via a tire valve to temporarily repair the puncture while, at the same time, inflating the tire with air (refer to, for example, Japan Unexamined Patent Publication Nos. 2010-120250, 2013-82137 and 2013-136176).

Devices for injecting such a puncture repair liquid can be broadly separated into hand squeeze types and pressurized delivery types. With the hand squeeze type, the puncture repair liquid is contained in a flexible container, and the puncture repair liquid is injected into a tire by squeezing the container by hand. Meanwhile, with the pressurized delivery type, the puncture repair liquid is contained in a pressure resistant container, and the puncture repair liquid is injected into a tire by utilizing compressed air supplied from a compressor for filling the tire air pressure. In both cases, the puncture repair liquid is installed in the vehicle for an extended period of time housed in the container.

The puncture repair liquid includes an active ingredient such as latex and functions to fill the puncture hole by being injected into the tire. While the puncture repair liquid can be used for an extended period of time, the puncture repair liquid does have an expiration date. When the expiration date is reached, the active ingredient may coagulate or other such problems may occur. In such cases, there is a concern that the repair work cannot be performed smoothly when the tire is punctured. However, because the puncture repair liquid installed in the vehicle has long expiration date, the user in effect does not keep track of the expiration date.

SUMMARY

The present technology provides an expiration date notification device and method for a puncture repair liquid for reliably notifying users of an expiration date of a puncture repair liquid that also enable repair work of a punctured tire to be performed smoothly.

An expiration date notification device for a puncture repair liquid installed in a vehicle according to an embodiment of the present technology includes:

a storage unit that stores an expiration date of a puncture repair liquid contained in a container;

a notification condition setting unit that sets a notification period and a notification manner for notifying of a replacement period of the puncture repair liquid based on the expiration date stored in the storage unit;

a notifying unit that notifies of the replacement period of the puncture repair liquid; and a control unit that controls the notifying unit based on settings of the notification condition setting unit.

An expiration date notification method for a puncture repair liquid according to an embodiment of the present technology includes:

activating an expiration date notification device for a puncture repair liquid installed in a vehicle that includes a storage unit that stores an expiration date of a puncture repair liquid contained in a container, a notification condition setting unit that sets a notification period and a notification manner for notifying of a replacement period of the puncture repair liquid based on the expiration date stored in the storage unit, a notifying unit that notifies of the replacement period of the puncture repair liquid, and a control unit that controls the notifying unit based on settings of the notification condition setting unit; and notifying a user of the vehicle of the replacement period of the puncture repair liquid within a preset notification period including before and after the expiration date of the puncture repair liquid via a preset notification manner.

In an embodiment of the present technology, the expiration date notification device for a puncture repair liquid installed in the vehicle notifies the user of the vehicle of the replacement period of the puncture repair liquid within a preset notification period including before and after the expiration date of the puncture repair liquid via a preset notification manner, thus users can be reliably notified of the expiration date of the puncture repair liquid. As a result, the user of the vehicle can appropriately replace the puncture repair liquid, and the puncture repair liquid can be kept in a good state. This enables the repair work of a punctured tire to be performed smoothly.

The expiration date notification device for a puncture repair liquid preferably further comprises a reading device that reads the expiration date on the container of the puncture repair liquid. By the reading device reading the expiration date on the container of the puncture repair liquid, the read expiration date can be easily and accurately input into the storage unit. Such a reading device is preferably an optical reading device.

The notification condition setting unit preferably sets a different notification manner for before and after the expiration date. With such a configuration, the need to replace the puncture repair liquid can be effectively conveyed to the user.

Preferably, the notification condition setting unit sets a new notification period based on an updated expiration date. By the notification condition setting unit setting the new notification period based on the updated expiration date, the notifications from the notifying unit up until this point in time can be removed.

DETAILED DESCRIPTION

Figure 1:
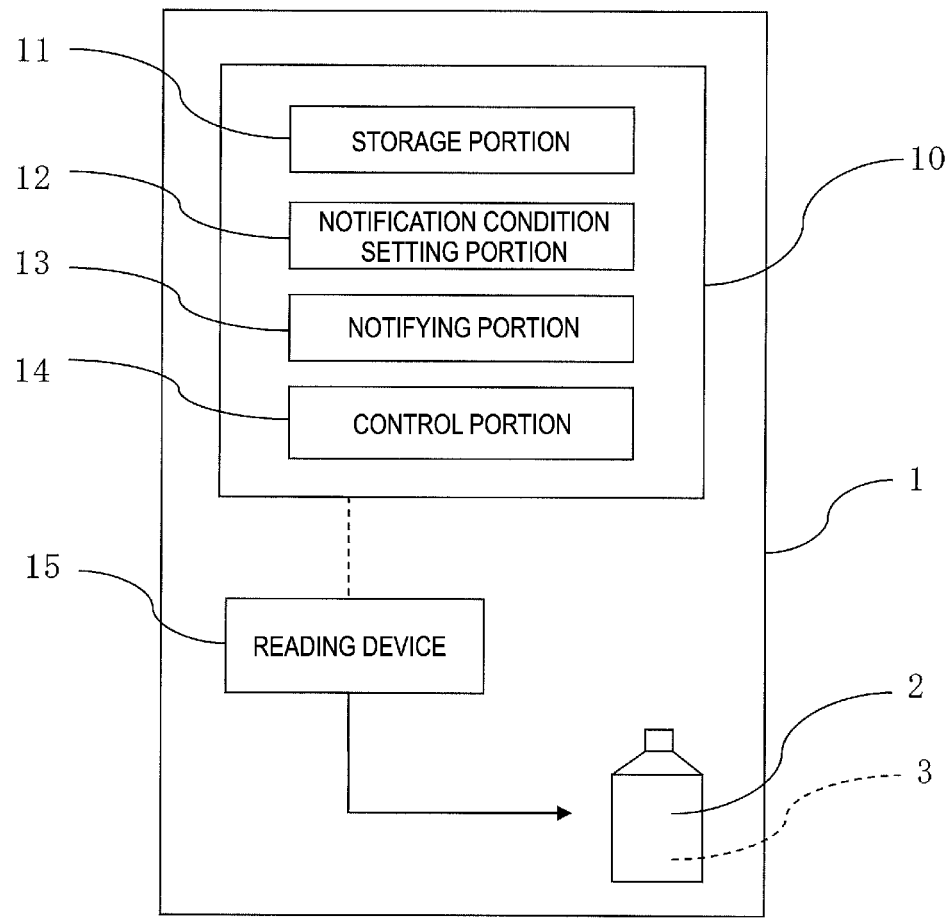
FIG. 1 is a configuration diagram illustrating an expiration date notification device for a puncture repair liquid according to an embodiment of the present technology.

Configurations of embodiments of the present technology are described in detail below with reference to the accompanying drawings. FIG. 1 is a diagram illustrating an expiration date notification device for a puncture repair liquid according to an embodiment of the present technology.

As illustrated in FIG. 1, an expiration date notification device 10 for a puncture repair liquid according to an embodiment of the present technology is a device installed in a vehicle 1 provided with a puncture repair kit including a puncture repair liquid 3 contained in a container 2. The expiration date notification device 10 may be an independent dedicated device, may be incorporated in an engine control unit (ECU) or navigation system of the vehicle 1, or may utilize a portion thereof.

The expiration date notification device 10 includes a storage portion 11 (storage unit) that stores the expiration date of the puncture repair liquid 3, a notification condition setting portion 12 (notification condition setting unit) that sets the notification period and notification manner for notifying of a replacement period of the puncture repair liquid 3 based on the expiration date stored in the storage portion 11, a notifying portion 13 (notifying unit) that notifies of the replacement period of the puncture repair liquid 3, and a control portion 14 (control unit) that controls the notifying portion 13 based on the settings of the notification condition setting portion 12. The expiration date notification device 10 includes, as necessary, a reading device 15 that reads the expiration date of the puncture repair liquid 3 on the container 2.

The storage portion 11 is constituted by a storage device such as a memory or a hard disk and stores the expiration date of the puncture repair liquid 3 input from an external portion. The expiration date is registered as an expiration date or the period of time until the expiration date. The expiration date does not necessarily include the day, and only the year and month can be stored. As the period of time until the expiration date, the length of time, for example, "5 years" or "7 years", can be stored. Such an expiration date can be updated.

The notification condition setting portion 12 is configured to set the notification period and notification manner based on the expiration date stored in the storage portion 11 and to perform this function via a computer program. The notification period can be set for any period of time based on the expiration date. For example, the notification period can be two months from one month before the expiration date to one month after the expiration date, 120 days from 60 days before the expiration date to 60 days after the expiration date, and the like. For the notification manner, preferably different notification manners are set for before and after the expiration date; however, the notification manner may be the same for both before and after the expiration date.

The notifying portion 13 notifies of the replacement period of the puncture repair liquid 3. Specific examples of notification methods include a warning sound, a warning light, a warning displayed on a display, and combinations thereof. Ways of changing the notification manner between before and after the expiration date include different notification intervals, different tones or intervals of a warning sound, different colors or flashing intervals of a warning light, different values, different display areas, different display sizes, different content in a warning delivered by synthetic speech, and the like. The notifying portion 13 may be configured to be instructed by a computer program to perform this function and in this case, for example, may cooperate with the audio or display of the navigation system. The notifying portion 13 may be mounted on the dashboard of a vehicle as an independent warning light or warning sound generating device.

The control portion 14 is configured to control the notifying portion 13 based on the settings of the notification condition setting portion 12 and to perform this function via a computer program. In other words, the control portion 14 determines whether or not the current date is within the notification period and, in the case of the current date being within the notification period, sends an instruction to the notifying portion 13 to notify of the replacement period of the puncture repair liquid 3. Additionally, in a configuration in which the notification condition setting portion 12 sets a different notification manner for before and after the expiration date, the control portion 14 determines whether or not the current date is before the expiration date and sends instructions to the notifying portion 13 to notify of the replacement period of the puncture repair liquid 3 by a notification manner that is different depending on whether the current date is before the expiration date or not.

The reading device 15 is configured to read the expiration date on the container 2 of the puncture repair liquid 3. Specifically, the reading device 15 is an optical reading device such as an optical character reader (OCR), a 1-D barcode reader, and a 2-D barcode reader. For example, reading an expiration date composed of numbers on the container 2 of the puncture repair liquid 3 with an OCR or reading an expiration date composed of a barcode with a barcode reader simplifies how the details are input and prevents mistakes being made. Imaging a bar code with a smart phone camera and using this as expiration date data is also an effective manner. The expiration date of the puncture repair liquid 3 read in this manner is input into the storage portion 11 of the expiration date notification device 10 via a wired circuit or wireless communication.

Note that an input device including a key pad can be used instead of the reading device 15 to input the expiration date of the puncture repair liquid 3 into the storage portion 11 of the expiration date notification device 10.

Figure 2:
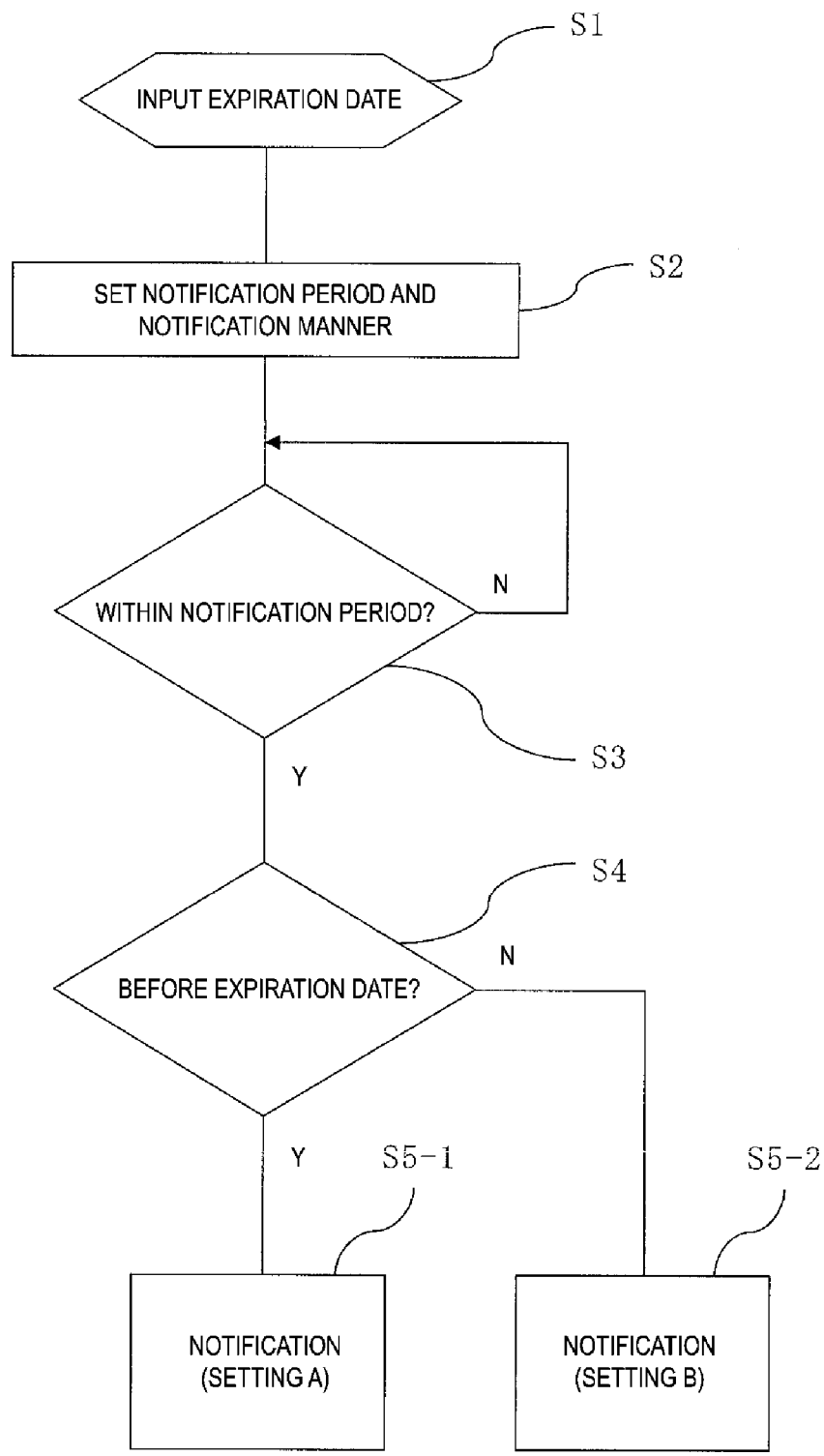
FIG. 2 is a flowchart illustrating the expiration date notification method for a puncture repair liquid according to an embodiment of the present technology.

FIG. 2 is a flowchart illustrating the expiration date notification method for a puncture repair liquid according to an embodiment of the present technology. In the case that the expiration date of the puncture repair liquid 3 is notified using the expiration date notification device 10 described above, as illustrated in FIG. 2, the user first inputs the expiration date of the puncture repair liquid 3 into the storage portion 11 (step S1). Such input operations may be performed at any stage during manufacture, shipping, or sale of the vehicle. Additionally, the input operation can be performed simply by using the reading device 15.

In the on state of the expiration date notification device 10, the notification condition setting portion 12 sets the notification period and notification manner for notifying of the replacement period of the puncture repair liquid 3 based on the expiration date stored in the storage portion 11 (step S2). Then, the control portion 14 determines whether or not the current date is within the notification period set in the notification condition setting portion 12 and, in the case of the current date being within the notification period, sends an instruction to the notifying portion 13 to notify of the replacement period of the puncture repair liquid 3 (step S3). Here, in a configuration in which the notification condition setting portion 12 sets a different notification manner for before and after the expiration date, the control portion 14 determines whether or not the current date is before the expiration date (step S4). If the current date is before the expiration date, for example, the control portion 14 sends instructions to notify based on a setting A, and in response to the instructions, the notifying portion 13 notifies based on the setting A (step S5-1); and if the current date is not before the expiration date, for example, the control portion sends instructions to notify based on a setting B, and in response to the instructions, the notifying portion 13 notifies based on setting B (step S5-2).

Figure 3:
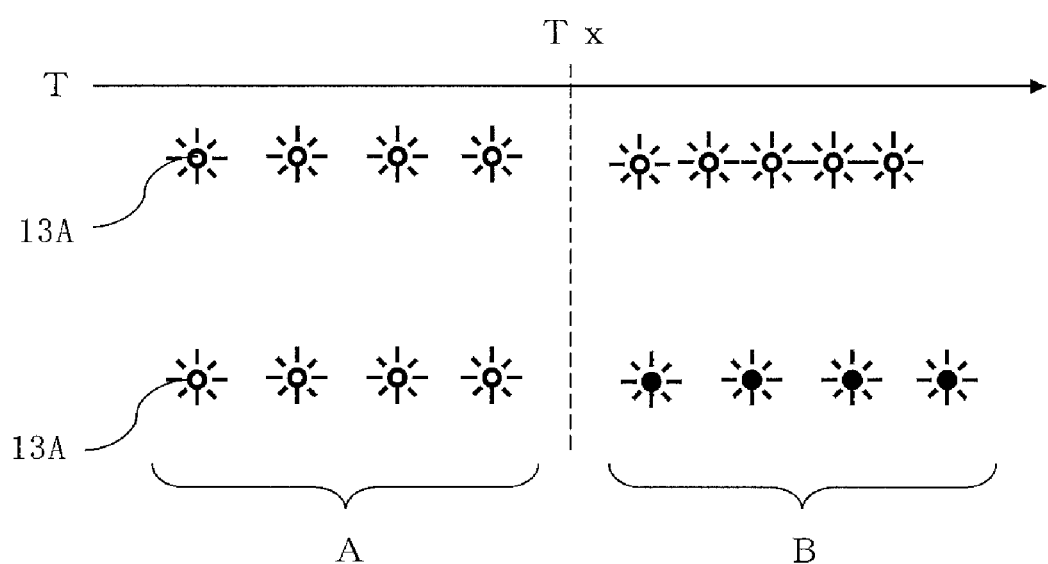
FIG. 3 is an explanatory diagram illustrating an example of a manner in which the replacement period is notified.

FIG. 3 illustrates a manner of notifying of the replacement period and illustrates a state in which a warning light 13A flashes in a time series T including an expiration date Tx. In the light pattern on the upper side in FIG. 3, the warning light 13A flashes at a first light interval based on the setting A before the expiration date, and the warning light 13A flashes at a second light interval less than the first light interval based on the setting B after the expiration date Tx. Also, in the light pattern on the lower side in FIG. 3, the warning light 13A flashes in a first color (for example, yellow) based on the setting A before the expiration date, and the warning light 13A flashes in a second color (for example, red) different from the first color based on the setting B after the expiration date Tx.

The expiration date notification device 10 installed in the vehicle 1 described above notifies the user of the vehicle 1 of the replacement period of the puncture repair liquid 3 within a preset notification period including before and after the expiration date of the puncture repair liquid 3 via a preset notification manner; thus, users can be reliably notified of the expiration date of the puncture repair liquid 3. As a result, the user of the vehicle 1 can appropriately replace the puncture repair liquid 3 approximately within the replacement period, and the puncture repair liquid 3 can be kept in a good state. Thus, when a tire of the vehicle 1 is punctured, the puncture repair liquid 3 in a good state can be used, and the repair work can be performed smoothly.

In particular, in an example in which the notification condition setting portion 12 changes the notification manner between before and after the expiration date, the need to replace the puncture repair liquid 3 can be effectively conveyed to the user. That is, by setting the notification after the expiration date to be more noticeable, when the expiration date is past, this state can be quickly remedied.

The notification condition setting portion 12 sets a new notification period based on the updated expiration date. Thus, after the puncture repair liquid 3 is replaced, the new expiration date is input into the storage portion 11. Then, the notification condition setting portion 12 sets the new notification period based on the updated expiration date, and the notifications from the notifying portion 13 up until this point in time are removed. Then, the expiration date management continues based on the new expiration date.

Figure 4:
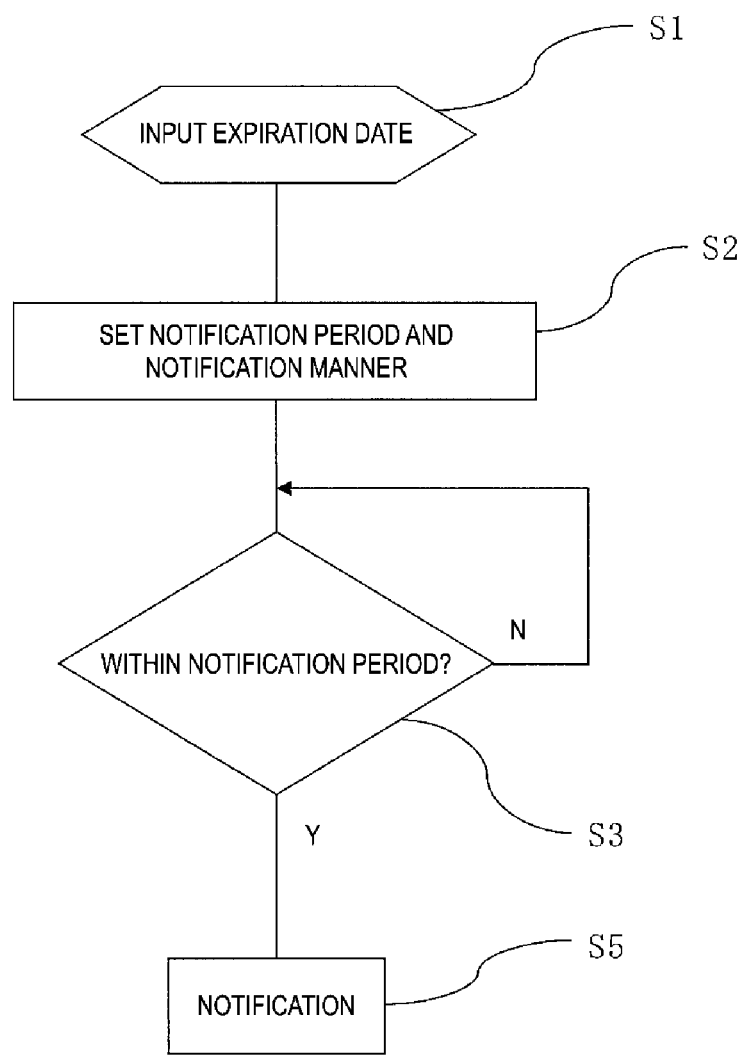
FIG. 4 is a flowchart illustrating the expiration date notification method for a puncture repair liquid according to a modified example of the present technology.

FIG. 4 is a flowchart illustrating the expiration date notification method for a puncture repair liquid according to a modified example of the present technology. In this example, the notification condition setting portion 12 sets a uniform notification manner for before and after the expiration date.

As illustrated in FIG. 4, as in the previous example, first, the expiration date of the puncture repair liquid 3 is input into the storage portion 11 (step S1). In the on state of the expiration date notification device 10, the notification condition setting portion 12 sets the notification period and notification manner for notifying of the replacement period of the puncture repair liquid 3 based on the expiration date stored in the storage portion 11 (step S2). Then, the control portion 14 determines whether or not the current date is within the notification period set in the notification condition setting portion 12 and, in the case of the current date being within the notification period, sends an instruction to the notifying portion 13 to notify of the replacement period of the puncture repair liquid 3 (step S3). In this way, the notifying portion 13 notifies of the replacement period of the puncture repair liquid 3 (step S5). This example, as in the embodiment described above, allows the users to be reliably notified of the expiration date of the puncture repair liquid 3.

The invention claimed is:

1. An expiration date notification device for a puncture repair liquid installed in a vehicle, comprising:
   a storage unit that stores an expiration date of a puncture repair liquid contained in a container;
   a notification condition setting unit that sets a notification period and a notification manner for notifying of a replacement period of the puncture repair liquid based on the expiration date stored in the storage unit;
   a notifying unit that notifies of the replacement period of the puncture repair liquid;
   a control unit that controls the notifying unit based on settings of the notification condition setting unit; and
   an optical reading device that reads the expiration date on the container of the puncture repair liquid.

2. The expiration date notification device for a puncture repair liquid according to claim 1, wherein the notification condition setting unit sets a different notification manner for before and after the expiration date.

3. The expiration date notification device for a puncture repair liquid according to claim 1, wherein the notification condition setting unit sets a new notification period based on an updated expiration date.

4. The expiration date notification device for a puncture repair liquid according to claim 2, wherein the notification condition setting unit sets a new notification period based on an updated expiration date.

5. An expiration date notification method for a puncture repair liquid, comprising:
   activating an expiration date notification device for a puncture repair liquid installed in a vehicle that comprises
   a storage unit that stores an expiration date of a puncture repair liquid contained in a container,
   a notification condition setting unit that sets a notification period and a notification manner for notifying of a replacement period of the puncture repair liquid based on the expiration date stored in the storage unit,
   a notifying unit that notifies of the replacement period of the puncture repair liquid,
   a control unit that controls the notifying unit based on settings of the notification condition setting unit, and
   an optical reading device reads the expiration date on the container of the puncture repair liquid;
   inputting the expiration date read by the optical reading device into the storage unit; and
   notifying a user of the vehicle of the replacement period of the puncture repair liquid within a preset notification period including before and after the expiration date of the puncture repair liquid via a preset notification manner.

6. The expiration date notification method for a puncture repair liquid according to claim 5, wherein the notification condition setting unit sets a different notification manner for before and after the expiration date.

7. The expiration date notification method for a puncture repair liquid according to claim 5, wherein the notification condition setting unit sets a new notification period based on an updated expiration date.

8. The expiration date notification method for a puncture repair liquid according to claim 6, wherein the notification condition setting unit sets a new notification period based on an updated expiration date.

\* \* \* \* \*